United States Patent
Kawata et al.

(10) Patent No.: US 6,577,758 B1
(45) Date of Patent: Jun. 10, 2003

(54) IMAGE POSITION DETECTION TECHNIQUE IN WHICH INPUT PARAMETERS CAN BE EASILY DETERMINED

(75) Inventors: Masayuki Kawata, Omiya (JP); Kenji Okuma, Urawa (JP); Hiroyuki Hasagawa, Urawa (JP)

(73) Assignee: Cognex Technology and Investment Corporation, Mountain View, CA (US)

( * ) Notice: Subject to any disclaimer, the term of this patent is extended or adjusted under 35 U.S.C. 154(b) by 0 days.

(21) Appl. No.: 09/404,535

(22) Filed: Sep. 24, 1999

(51) Int. Cl.$^7$ .................................................. G06K 9/00
(52) U.S. Cl. ........................ 382/151; 382/199; 382/291
(58) Field of Search ................................ 382/141, 151, 382/286, 289, 293, 295, 291, 194, 288, 199; 348/94, 95; 356/614

(56) References Cited

U.S. PATENT DOCUMENTS

| | | | |
|---|---|---|---|
| 4,802,230 A | * 1/1989 | Horowitz | 382/199 |
| 5,495,537 A | 2/1996 | Bedrosian et al. | 382/209 |
| 5,559,727 A | * 9/1996 | Deley et al. | 356/400 |
| 5,602,937 A | 2/1997 | Bedrosian et al. | 382/151 |
| 5,796,868 A | 8/1998 | Dutta-Choudhry | 382/199 |
| 5,872,870 A | 2/1999 | Michael | 382/291 |
| 5,933,523 A | 8/1999 | Drisko et al. | 382/151 |
| 5,974,169 A | 10/1999 | Bachelder | 382/151 |
| 6,002,793 A | 12/1999 | Silver et al. | 382/152 |

OTHER PUBLICATIONS

U.S. patent application Ser. No. 09/436,356, Kawata.

* cited by examiner

*Primary Examiner*—Amelia M. Au
*Assistant Examiner*—Colin LaRose
(74) *Attorney, Agent, or Firm*—Russ Weinzimmer

(57) ABSTRACT

A position detection tool in a machine vision system finds the position of target objects in a digital image using the length and width of the target object as parameters. The input length and width dimensions are measured by the developer as the length and width of a simple hypothetical rectangle that surrounds the object. For most shapes, the developer can easily obtain these two measurements. The position detection tool can easily be adapted to discern particular image patterns from multiple component images.

9 Claims, 5 Drawing Sheets

IMAGE POSITION DETECTION TECHNIQUE IN WHICH INPUT PARAMETERS CAN BE EASILY DETERMINED

BACKGROUND OF THE INVENTION

1. Field of the Invention

The present invention relates to machine vision systems, and more particularly to machine vision systems for detecting the position of an object.

2. Description of Background Information

Many manufacturing processes are automated to enhance speed and efficiency. For example, in the assembly of printed circuit boards (PCBs), robotic arms are often used to insert surface mounted devices (SMDs), such as semiconductor chips, resistors, and capacitors, onto the PCBs. Machine vision systems assist in the automated manufacturing process. Generally, in a machine vision system, a digital picture of the manufacturing area of interest is taken and interpreted by a computer. Machine vision systems perform a variety of tasks, including machine guidance (e.g., guiding the robotic arm to insert its SMD at the correct location), part identification, gauging, alignment, and inspection.

One particular task performed by machine vision systems is the task of position detection or pattern recognition. In position detection problems, a description of the object of interest is given to the machine vision system, which then applies a position detection algorithm to find the location of the object in images taken during the manufacturing process.

Conventional pattern matching algorithms include the so-called "caliper" and "blob" matching algorithms. The caliper algorithm is modeled after a mechanical caliper. The developer specifies the desired separation between the caliper "jaws" —or the approximate distance between parallel edge pairs of interest on the object. The vision system then searches the image for a pair of parallel edges that match the given description. Blob matching algorithms locate objects by searching an image for connected areas of similar intensity with an area that matches an area given by the developer.

One disadvantage associated with the blob and caliper pattern recognizing algorithms, however, is the restricting nature of the required input parameters. For example, for the caliper algorithm, distinctive parallel edges must be present on the object, and for the blob algorithm, the developer must be able to measure the area of the object. Measuring the area of the object may not be easy, particularly if the object has convex or concave edges.

Thus, as described above, with conventional pattern matching algorithms, measuring appropriate object input parameters may be troublesome.

SUMMARY OF THE INVENTION

It is an object of the present invention to provide improved pattern matching methods and systems.

One aspect of the present invention is a computer vision system comprising a plurality of components, including: a camera, a processor connected to the camera, and a computer memory. The processor receives images taken by the camera, the images including images of an object. The computer memory is coupled to the processor and stores a first linear dimension measurement and a second linear dimension measurement of the object. The computer instructions, when executed by the processor, detect a midpoint of the object by calculating maximum distances between edge pixels in the image for each of a plurality of orientations of an orthogonal coordinate system and comparing the calculated maximum distances to the first and second length dimensions.

A second aspect of the present invention is directed to a method of detecting a position of an object in an image. The method comprises receiving a first linear dimension measurement and a second linear dimension measurement of an object, the direction of the first and second dimension measurements being orthogonal to one another. Maximum distances are calculated between edge pixels in the image in the direction of the linear dimensions, the maximum distance being calculated for each of a plurality of orientations of the first and second orthogonal dimensions in the image. Further, local minima and maxima are detected from a curve defined by the maximum distances and the plurality of orientations of the first and second orthogonal dimensions, and the position of the object is calculated based on the local minima or maxima that are closest to the received first and second linear dimension measurements.

A third aspect of the present invention is a method of recognizing a target component image from a larger image having a plurality of component images. The method comprises receiving a first linear dimension measurement and a second linear dimension measurement of an object corresponding to the target component image and segmenting the larger image into the plurality of component images. Additional, an error an error amount is calculated for each of the plurality of component images based on a calculation of maximum distances between edge pixels in each of the component images for each of a plurality of orientations of an orthogonal coordinate system defined by the first and second linear dimensions and comparing the calculated maximum distances to the first and second linear dimensions. Finally, the target component image is recognized as the component image with the smallest error amount.

BRIEF DESCRIPTION OF THE DRAWINGS

The above and other objects, features, and advantages of the present invention are further described in the detailed description which follows, with reference to the drawings by way of non-limiting exemplary embodiments of the present invention, wherein like reference numerals represent similar parts of the present invention throughout the several views and wherein.

DETAILED DESCRIPTION OF THE ILLUSTRATED EMBODIMENTS

Reference will now be made in detail to embodiments of the invention, examples of which are illustrated in the accompanying drawings. Wherever possible, the same reference numbers will be used throughout the drawings to refer to the same or like parts.

As generally described herein, a position detection tool may find the position of target objects in a digital image using the length and width of the target object as parameters. The input length and width dimensions are measured by the developer as the length and width of a hypothetical rectangle that surrounds the object. For most shapes, the developer can easily obtain these two measurements.

Figure 1:
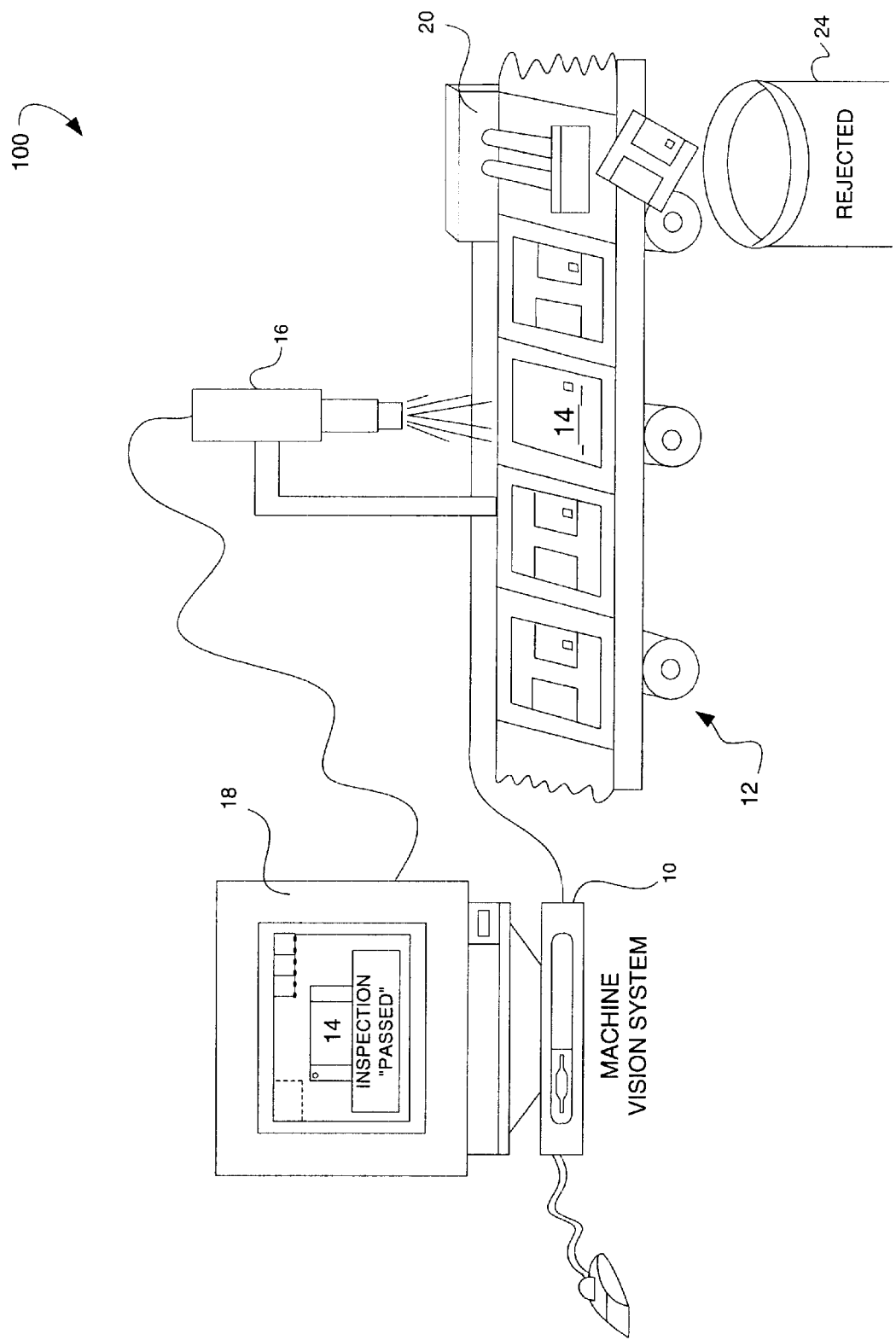
FIG. 1 is a diagram of an illustrative machine vision system for inspecting objects.

FIG. 1 is a diagram of an illustrative machine vision system 100 for inspecting objects. Vision system 100 includes a computer 10 connected to a monitor 18 and a camera 16. Images taken with camera 16 are transferred to computer 10. Computer 10 contains a processor and computer readable memory, which may be, for example, a computer random access memory or a hard disk drive. Computer instructions stored in the computer memory, such as the instructions that comprise the position detection tool, are executed by the processor.

In operation, objects, such as computer disks 14, move along manufacturing line 12. Camera 16 takes pictures of disks 14 as they pass underneath. Computer 10 processes the images to extract information useful to the manufacturing line. In this example, the goal of vision system 100 is to inspect disks 14 and determine whether they comply with predetermined specifications relating to size, shape, or other characteristics. Disks that fail inspection may be removed from the manufacturing line 12 into rejection bin 24 by diverter 20.

While inspecting images from camera 16, computer 10 may employ a number of image processing techniques. For example, position detection algorithms locate disk 14 within each image. Once located, additional image processing algorithms determine if the disk passes inspection.

Implementation of the position detection tool will be described in detail with reference to the flow chart of FIG. 2 and FIGS. 3–7.

Figure 2:
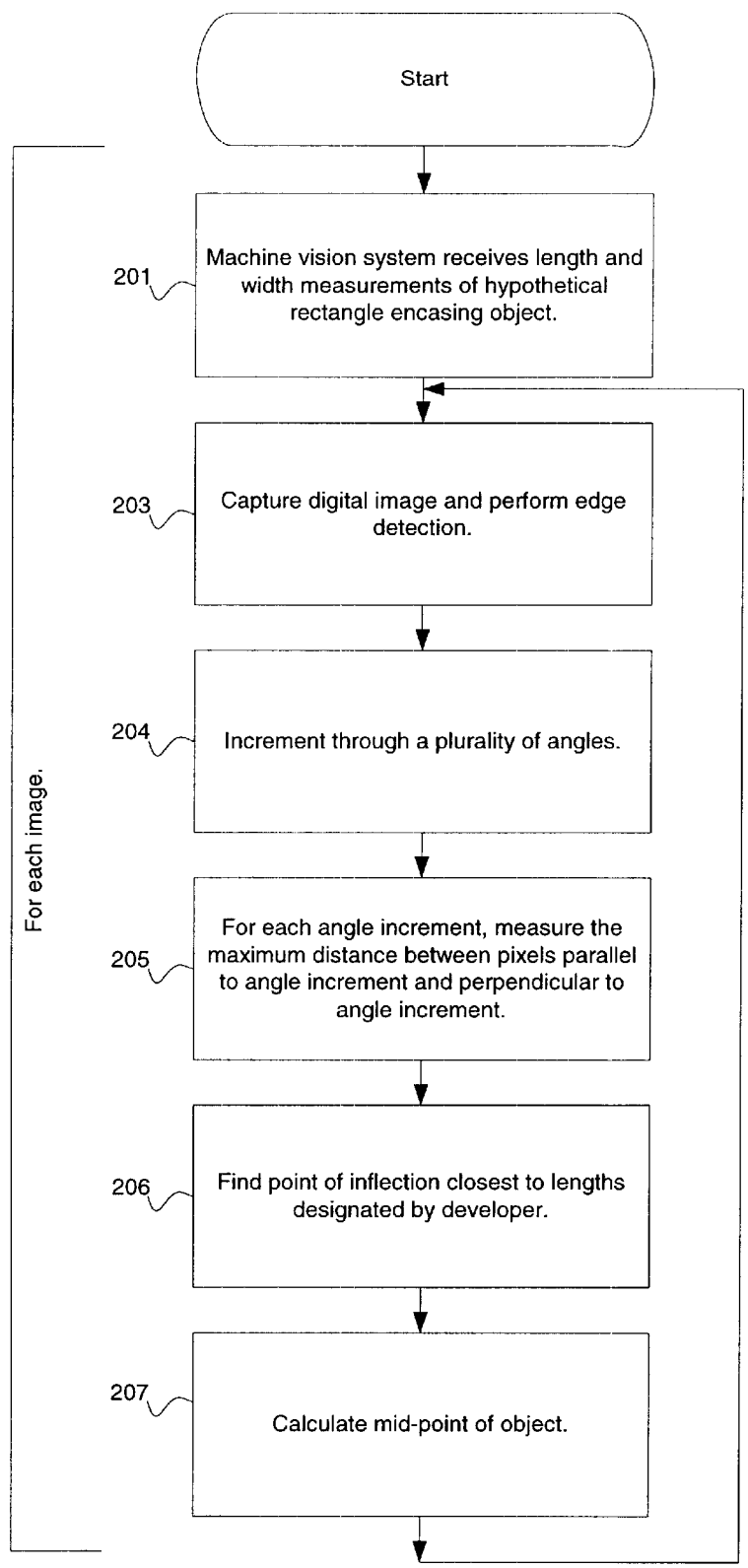
FIG. 2 is a flow chart illustrating a process performed by the illustrated machine vision systems.

FIG. 2 is a flow chart illustrating tasks performed by machine vision system 10. The machine vision system begins by receiving the length and width measurements of a hypothetical rectangle encasing the object of interest. (Task 201). These measurements may be input to vision system 10 by a system developer or system user. The measurements may also be pre-input by a user and stored in the memory of vision system 10.

Figure 3A:
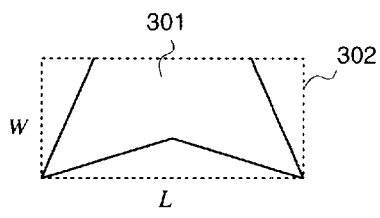
FIGS. 3A–3C illustrate exemplary object shapes and corresponding hypothetical rectangles.
Figure 3B:
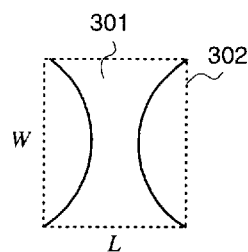
Figure 3C:
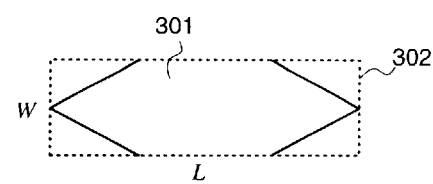

FIGS. 3A–3C illustrate exemplary object shapes 301 and their corresponding hypothetical rectangles 302. When defining the hypothetical rectangle, the developer simply measures the two largest linear lengths (labeled "l" and "w") along orthogonal dimensions that encapsulate the object. For most objects, the two measurements are intuitively obvious and can be quickly and simply measured by the developer, even for the irregular shaped objects shown in FIGS. 3A–3C.

Figure 4A:
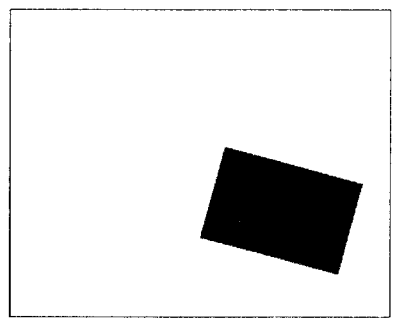
FIGS. 4A and 4B are diagrams illustrating images before and after edge detection, respectively.
Figure 4B:
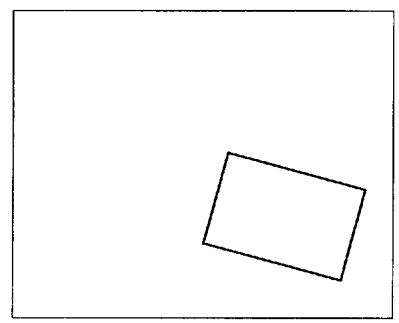

For each digital image, vision system 10 performs edge detection to extract the high contrast edges in the image. (Task 203). FIGS. 4A and 4B illustrate an exemplary image before and after edge detection, respectively. The well known Sobel edge detection algorithm may be used to perform task 203. A number of other edge detection algorithms may alternatively be used.

For each edge detected image, vision system 10 assigns an arbitrary reference origin to the image and tabulates length and width measurements in the image for each of a plurality of angles. (Tasks 204, 205). As used herein, the length and width measurements tabulated by vision system 10 refer to the maximum distance between pixels in the edge extracted image taken along orthogonal length and width axes. The length and width measurements are taken for each of a plurality of orientations of the length and width axes. These concepts will be further explained with reference to FIG. 5.

Figure 5:
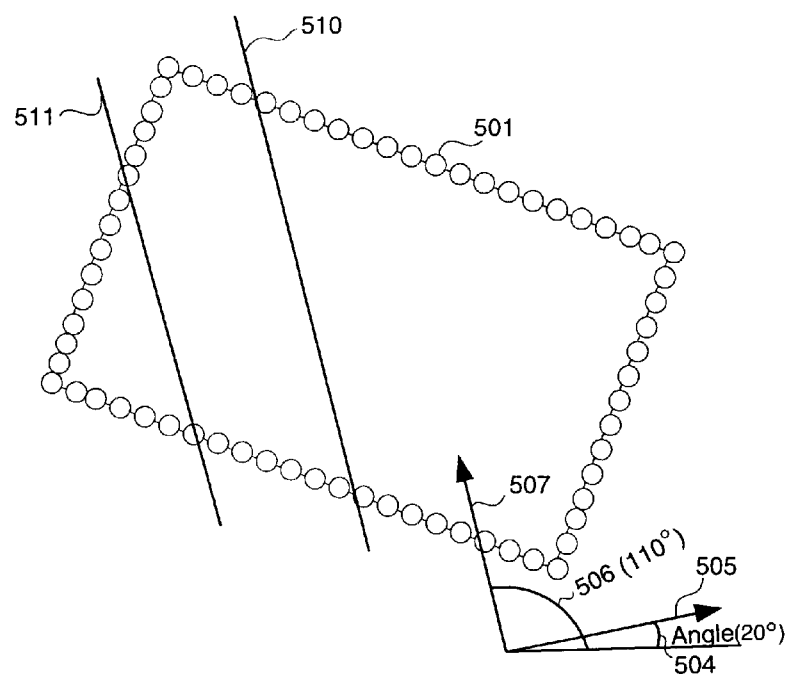
FIG. 5 is diagram of an enlarged version of the image shown in FIG. 4B.

FIG. 5 is an enlarged version of the edge extracted image shown in FIG. 4B. Circles 501 represent pixels in the image that comprise the edge detected pixels. The non-edge detected pixels are not shown and FIG. 5 and, for purposes of this discussion, will be assumed to be absent from the image. Point 502 represents an arbitrary origin assigned by vision system 10. Angle 504 with line 505 are designated as the "length" axis and angle 506 with line 507 are designated as the "width" axis. The length and width axes are orthogonal to one another (i.e., angles 504 and 506 are separated by ninety degrees). If angle 504 is incremented from −45 to +45 degrees in increments of one degree, angle 506 would be correspondingly incremented from +45 to +135 degrees. Each angle increment defines an orientation of the length and width axes in the image.

At each angle increment, vision system 10 obtains the maximum distance between each pair of edge pixels 501 that lie in the set of lines constructed parallel to the length axis. More specifically, vision system 10: (a) calculates the distance between pairs of edge pixels intersecting a given line parallel to that angle increment, (b) repeats (a) for each line parallel to that angle increment that intersects a pair of pixels, and (c) selects the maximum distance of all the distances calculated in (a). The maximum distance selected in (c) is the length measurement for that particular angle increment (i.e., for the particular angle 504 and line 505). Tasks (a), (b), and (c) are performed for each angle increment to thus obtain a plurality of length measurements.

A plurality of width measurements are similarly obtained for lines constructed parallel to the width axis (i.e., for angle 506 and line 507) for each of a plurality of angle increments.

An example of the above described procedure will now be described with reference to FIG. 5. As shown in FIG. 5, the pixels intersected by line segment 510, which is parallel to line 507, is the width measurement for angle 506 and line 507 because these pixels define the maximum separation of a line parallel to line 507. The distance between the pixels intersected by line segment 511, which is also parallel to width axis 507, is less than the distance between the pixels intersected by line segment 510. Therefore, the distance between the pixels intersected by line 511 does not define the width measurement for angle 506.

Figure 6:
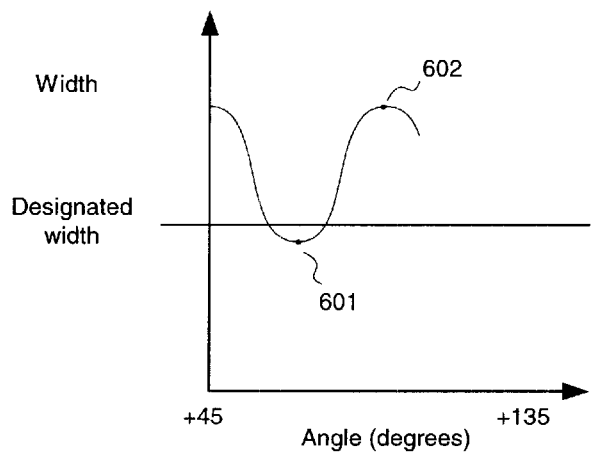
FIG. 6 is a graph plotting angle versus measured distance for the width measurements of the rectangle shown in FIG. 5.

When vision system 10 has measured all the length and width measurements, it searches the measurements for points of inflection (i.e., local maxima or minima) that are closest to the measurements designated by the developer. (Task 206). FIG. 6 is a graph plotting angle versus the maximum distances for the width measurements of the rectangular image shown in FIG. 5. Two inflection points, 601 and 602, are shown. Inflection point 601 is the closest inflection point to the user's designated width measurement. Accordingly, the angle corresponding to inflection point 601 corresponds to the direction of the width of the object. A similar procedure is implemented for the length measurement. As an error check, vision system 10 may compare the two angles corresponding to the length and width directions of the object to ensure that they are separated by 90 degrees.

Figure 7:
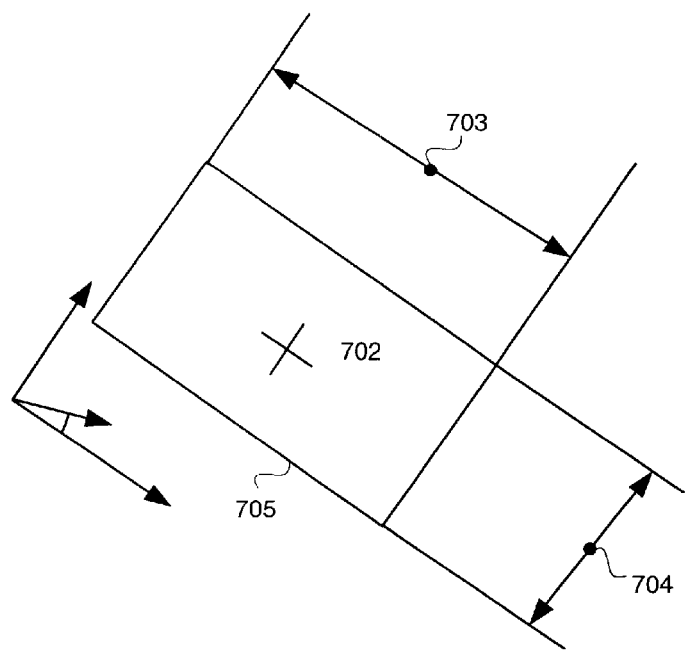
FIG. 7 is a diagram illustrating a rectangle and its midpoint.

With the angles corresponding to the length and width measurements in hand, vision system 10 calculates the mid-point of the outermost pixels in the direction of the width and the mid-point of the outermost pixels in the direction of the length direction obtained in task 206. (Task 207). These two midpoints specify the position of the object as the center of the hypothetical rectangle. FIG. 7 is a diagram graphically illustrating midpoint 702 of a rectangle 705. Length midpoint 703 and width midpoint 704 are also shown.

Although the embodiment illustrated above for the position detection tool was primarily described in reference to the position detection of a simple rectangle, the concepts discussed above would apply equally well to any object shape.

The above-described position detection tool calculates the mid-point of an object in an image, thus detecting the position of the object, by finding the directions of the length and width lines defining a hypothetical rectangle surrounding the object. The input parameters required by the position detection tool—the length and width measurements of the hypothetical rectangle—can easily be measured by the developer for a wide variety of object shapes.

Figure 8:
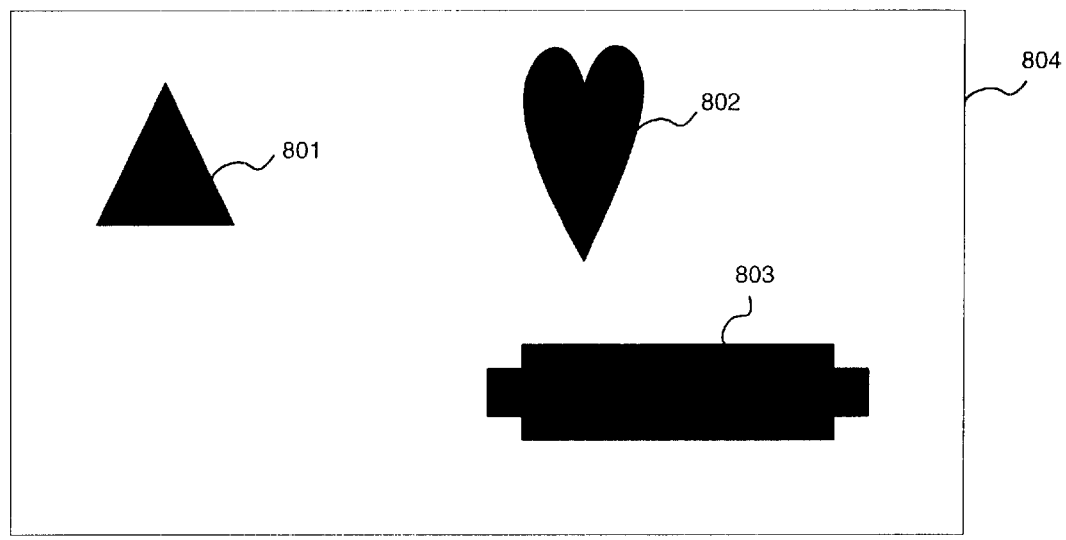
FIG. 8 is a diagram of multiple component images within a larger image.

In addition to detecting the position of an object in an image, the techniques described herein may also be applied to recognize a component image from a larger image having multiple component images. In this application of the position detection tool, the image taken by camera 16 is first segmented and edge detected so that the component images can be recognized by the vision system. FIG. 8 is a diagram of multiple component images 801, 802, and 803 within a larger image 804.

Once vision system 10 separates component images 801, 802, and 803 from image 804, it applies the above-described position detection tool to each component image. The component image with the smallest error between the calculated length and width measurements and the input length and width measurements can be assumed to be the sought after pattern. Alternatively, a pattern may be considered recognized if the error between the calculated length and width measurements and the input length and width measurements is below a preset value.

While the invention has been described by way of exemplary embodiments, it is understood that the words used herein are words of description, rather than words of limitation. Changes may be made, within the purview of the appended claims, without departing from the scope and the spirit of the invention in its broader aspects. Although the invention has been described herein with reference to particular structure, materials, methods, and embodiments, it is understood that the invention is not limited to the particulars disclosed. The invention extends to all equivalent structures, mechanisms, and uses.

What is claimed is:

1. A method of determining a position of an object in an image, the method comprising:
   receiving a length and a width of a minimum enclosing rectangle of an image of the object;
   performing edge detection in the image to provide an edge-detected image having an object boundary of edge pixels;
   assigning to the edge-detected image an arbitrary reference origin of an orthogonal coordinate system having a length axis and a width axis;
   calculating maximum distances between edge pixels in the edge-detected image traversed by a length axis and a width axis of the orthogonal coordinate system for each of a plurality of orientations of the orthogonal coordinate system;
   detecting inflection points in a curve defined by the maximum distances versus the plurality of orientation of the orthogonal coordinate system; and
   calculating the position of the object based on the inflection points that are closest to the received length and width of the minimum enclosing rectangle of the image of the object.

2. The method of claim 1, wherein calculating maximum distances between edge pixels further comprises:
   determining distances between all pairs of pixels traversed by a length axis and a width axis of the orthogonal coordinate system; and
   searching the determined distances for the maximum distance.

3. The method of claim 1, wherein calculating the position of the object further comprises:
   calculating the mid-point of the maximum distance in the direction of the length of the object, and in the direction of the width of the object, these two mid-points together specifying the position of the object in the image.

4. A computer vision system for determining the position of an object in an image, the system comprising:
   a camera;
   a processor connected to the camera, the processor receiving images taken by the camera, the images including images of an object; and
   a computer memory operatively coupled to the processor, the computer memory storing:
      a length and a width of a minimum enclosing rectangle of an image of the object, and
      computer instructions that, when executed by the processor, determines the position of a mid-point of the object by:
         performing edge detection in the image to provide an edge-detected image having an object boundary of edge pixels;
         assigning to the edge-detected image an arbitrary reference origin of an orthogonal coordinate system having a length axis and a width axis;
         calculating maximum distances between edge pixels in the edge-detected image traversed by a length axis and a width axis of the orthogonal coordinate system for each of a plurality of orientations of the orthogonal coordinate system,
         comparing the calculated maximum distances to the length and width of the minimum enclosing rectangle of the image of the object to determine the directions of the length and width of the object, and
         calculating the mid-point of the maximum distance in the direction of the length of the object, and in the direction of the width of the object, these two mid-points together specifying the position of the object in the image.

5. The computer vision system of claim 4, wherein the directions of the length and the width are compared to ensure that they are separated by 90 degrees.

6. The computer vision system of claim 4, wherein comparing the calculated maximum distances to the length and width of the minimum enclosing rectangle of the image of the object further includes:
   detecting inflection points in a curve defined by the maximum distances versus the plurality of orientations of the orthogonal coordinate system.

7. The computer vision system of claim 4, wherein the length and width are provided a prior by one of a user and a developer.

8. A computer readable medium containing instructions that when executed by a processor perform the acts of:

receiving a length and a width of a minimum enclosing rectangle of an image of the object;

performing edge detection in the image to provide an edge-detected image having an object boundary of edge pixels;

assigning to the edge-detected image an arbitrary reference origin of an orthogonal coordinate system having a length axis and a width axis;

calculating maximum distances between edge pixels in the edge-detected image traversed by a length axis and a width axis of the orthogonal coordinate system for each of a plurality of orientations of the orthogonal coordinate system;

detecting inflection points in a curve defined by the maximum distances versus the plurality of orientation of the orthogonal coordinate system; and calculating the position of the object based on the inflection points that are closest to the received length and width of the minimum enclosing rectangle of the image of the object.

9. The computer readable-medium of claim 8, wherein calculating maximum distances between edge pixels further includes computer instructions for:

determining distances between all pairs of pixels traversed by a length axis and a width axis of the orthogonal coordinate system; and searching the determined distances for the maximum distance.

* * * * *